United States Patent [19]

Hair et al.

[11] Patent Number: 4,736,089
[45] Date of Patent: Apr. 5, 1988

[54] SWITCHING REGULATOR FOR TERMINAL PRINTHEAD

[75] Inventors: Victor D. Hair, Austin; Mickey H. Everett, Leander, both of Tex.

[73] Assignee: Texas Instruments Incorporated, Dallas, Tex.

[21] Appl. No.: 371,362

[22] Filed: Apr. 23, 1982

Related U.S. Application Data

[63] Continuation of Ser. No. 146,992, May 5, 1980, abandoned.

[51] Int. Cl.[4] .................. H04L 15/34; H05B 1/00
[52] U.S. Cl. ............................. 219/216; 323/351; 323/283
[58] Field of Search ................. 323/282–287, 323/907; 361/152, 191–192; 219/216, 216 PH, 501, 505, 507; 346/76 PH

[56] References Cited

U.S. PATENT DOCUMENTS

| | | | |
|---|---|---|---|
| 3,577,137 | 5/1971 | Brennan, Jr. | 219/216 PH |
| 3,835,368 | 9/1974 | Williams | 323/351 |
| 3,878,358 | 4/1975 | Barton et al. | 219/216 |
| 3,906,310 | 9/1975 | Esashika | 323/282 X |
| 3,946,302 | 3/1976 | Kovalick et al. | 323/299 |
| 4,059,844 | 11/1977 | Stewart | 361/191 X |
| 4,176,272 | 11/1979 | Powers | 219/216 |

OTHER PUBLICATIONS

G. M. Heiling et al., "Thermal Print Head Power Supply Regulator", IBM Technical Bulletin, vol. 22, No. 5, Oct. 1979, p. 2023.

Primary Examiner—Peter S. Wong
Attorney, Agent, or Firm—Thomas G. Devine; James T. Comfort; Melvin Sharp

[57] ABSTRACT

The thermal printhead of a printing terminal requires a controlled voltage to insure uniformity of the print copy. Printhead temperature is sensed by a voltage generating diode on the printhead itself. This feedback voltage is used to control the reference voltage of a switching regulator power supply which in turn provides power to the thermal printhead. The switching regulator comprises an efficient means of providing a controlled voltage to the thermal printhead.

3 Claims, 3 Drawing Sheets

SWITCHING REGULATOR FOR TERMINAL PRINTHEAD

This is a continuation of application Ser. No. 146,992, filed May 5, 1980, now abandoned.

BACKGROUND OF THE INVENTION

1. Field of the Invention

This invention relates generally to the provision of a controlled voltage for the printing element of a printing terminal and more specifically to the use of switching regulator power supplies for the printing element of a thermal printing terminal.

2. Description of the Prior Art

Various types of printing terminals are known including that disclosed in U.S. Pat. No. 3,638,197. Such printing terminals are adapted to provide a hard copy display of information, typically but not limited to alphanumeric information. Certain printing terminals use thermal printheads such as the semiconductor printheads disclosed in U.S. Pat. Nos. 3,496,333 and 3,988,569. Other types of thermal printheads are known and are fabricated using thick or thin film processes. Still other types of printing mechanisms include wire matrix printing elements and inkjet printing elements. Various of these printing elements require the provision of a controlled voltage to effect the printing operation.

In the case of certain types of printheads it is desirable to provide some type of feedback representative of the effectiveness of the printing element. Thus, in the case of semiconductor thermal printheads, as illustrated in U.S. Pat. No. 3,577,137 it is desirable to provide a feedback voltage representative of the operating temperature of the printhead. This feedback voltage is used to control the voltage level of the power supplied to the thermal printhead. The feedback voltage is typically generated by a semiconductor diode located on the printhead structure itself. The nature of the feedback is such that as the printhead temperature tends to move about its nominal value, the voltage supplied to the printhead is reduced thereby tending to maintain the printhead at the desired nominal temperature. In such prior art systems as illustrated by the above referenced patent, a linear type voltage regulator is used to supply power. Because of the requirement for a variable voltage supply to the printhead this linear regulation technique is inefficient. A substantial portion of the power from the power supply is dissipated in the regulating transistors themselves.

BRIEF SUMMARY OF THE INVENTION

A switching regulator power supply is utilized to provide the supply voltage to a thermal printhead. Switching regulator power supplies have been described in the past, for example in a paper entitled "Low-Frequency Characterization of Switched dc-dc Converters", G. W. Wester and R. D. Middlebrook, IEEE Transactions on Aerospace and Electronic Systems, vol. AES-9, No. 3, May, 1973, pp 376–85.

The thermally sensitive feedback voltage from a diode on the thermal printhead is combined with a second offset voltage to provide the reference voltage for the switching regulator. In the preferred embodiment the switching regulator is of the pulsewidth modulated type. Since the switching transistors are either hard on or hard off there is very little loss in the switching transistors themselves in either of these states. The only substantial losses in the switching transistors are those occurring during switching and these represent a relatively small portion of the total power provided by the supply.

The pulsewidth modulated switching regulator action is achieved in a novel way through the use of a D flip flop in the control loop of the power amplifier. Synchronization of the loop is achieved with a squarewave signal provided to the clock input of the flip flop. This eliminates the need for a capacitor to integrate the squarewave timing signal into a sawtooth waveform as required by most externally synchronized switching regulator supplies. Further, use of the clocked flip flop enables a simple over current protection scheme. Conventionally, current limiting is done by sampling the current and turning off the power transistor when a preset maximum safe level is exceeded. In such case the transistor switch is on and off at a virtually uncontrolled frequency resulting in excessive power dissipation due to the increased switching losses. With the clocked flip flop in the control loop, switching during the initial turn-on period remains under synchronization of the clock input to the flip flop. Thus excessive switching is avoided.

Switching mode regulators have been used to drive the printing elements of wire matrix and other impact printheads as exemplified by U.S. Pat. Nos. 3,909,681, 4,041,546 and 4,059,844 and by copending application Ser. No. 943,822, filed Sept. 19, 1978, now U.S. Pat. No. 4,227,230. Such regulators, however, have not been used to drive the thermal printhead of a printing terminal.

It is therefore an object of the invention to provide a switching regulator supply for the printing mechanism of a printing terminal employing a thermal printhead.

It is another object of the invention to provide an improved switching regulator power supply.

Other objects of the invention will be evident in the detailed description that follows.

DETAILED DESCRIPTION OF THE INVENTION

Figure 1:
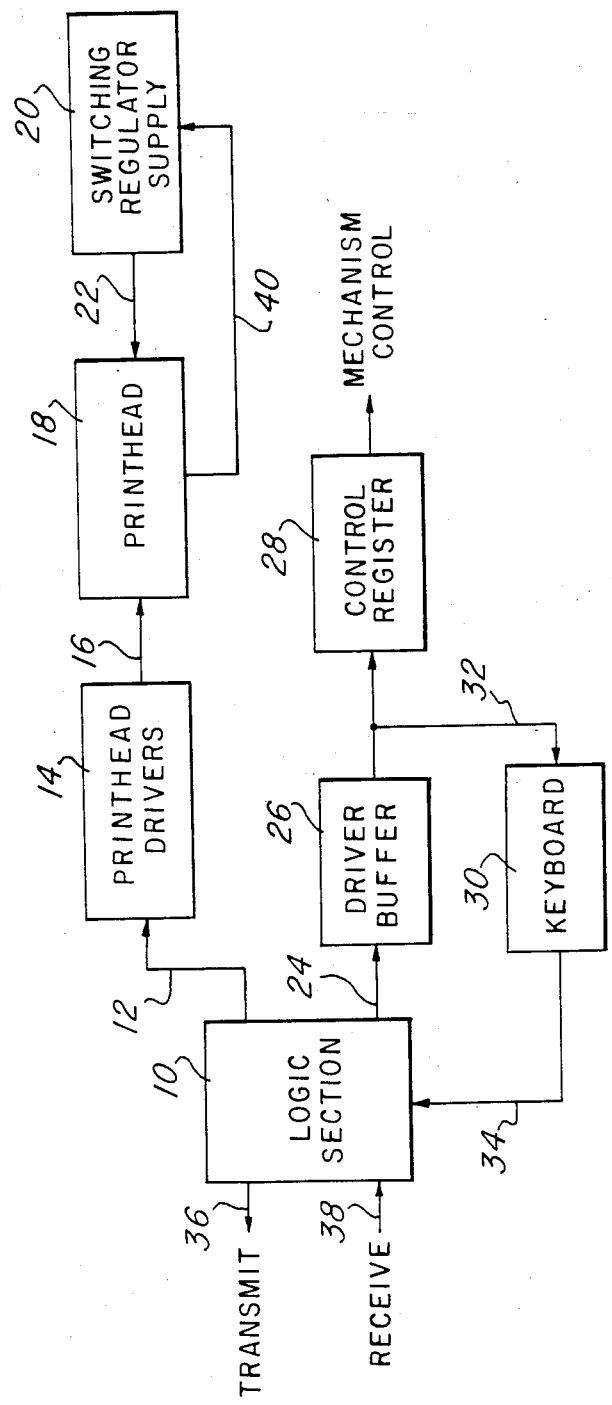
FIG. 1 is a block diagram showing a printing terminal.

FIG. 1 is a block diagram of a printing terminal embodying the present invention. There is shown at 10, a logic section which in the preferred embodiment comprises first a central processing unit (CPU). The CPU may be a model TMS8080 microprocessor functioning under the control of ROM storage which may comprise one or more model TMS4700 ROMs. Additional storage is provided by one or more model TMS4036 RAMs. Both parallel and serial data input and output services, as well as masked prioritized interrupts and interval timers, are provided by a model TMS5501 I/O chip. Each of the above referenced TMS devices is available from Texas Instruments Incorporated of Dallas, Texas. Address decode circuits of the type well known in the art respond to the digital addresses provided by the microprocessor to properly address other system elements.

Thermal printhead 18 comprises a two 5×7 matrices of semiconductor print elements. The particular set of elements to be energized to print a given character are determined by signals appearing coupled by line 12 to printhead drivers 14. The printhead drivers in turn directly energize certain printhead elements by signals appearing on line 16. Power for the printhead is provided on line 22 by switching regulator power supply 20. A signal representative of the temperature of printhead 18 is generated by a diode resistor combination on the printhead and is connected by line 40 back to switching regulator supply 20.

Other signals for controlling operation of the terminal are coupled by line 24 to driver buffer 26 and from there via line 32 to control register 28 and keyboard 30. Control register 28 provides a series of mechanism control signals for regulating functions such as printhead carriage movement, and line feed. Other signals on line 32 are utilized to strobe keyboard 30 and the resultant signals representative of depressed keys are coupled by line 34 back to the logic section 10.

Logic section 10 communicates with external systems such as a remote terminal or computer through the I/O chip on a serial transmit channel 36 and a serial receive channel 38. Serial transmit and receive channels 36 and 38 may be coupled to a telephone line by means of a modem assembly as is well known in the art. The modem may be a unit separate from the printing terminal or may be an integral part thereof.

With the exception of switching regulator supply 20, representative networks comprising the various blocks in FIG. 1 are illustrated in U.S. Pat. No. 4,172,990.

As illustrated in the aforementioned U.S. Pat. No. 3,577,137, the temperature compensation signal is provided by the voltage developed across a diode/resistor combination on the thermal printhead itself. This D-volt signal is selected to have a nominal value at some preselected temperature, i.e., 25° C., and with the diode properly biased will have a temperature coefficient of −2 millivolts per degree Celsius. It has been shown experimentally that the desired relationship between D-volts and the printhead excitation voltage, P-volts, is of the form shown below.

P-volts=(A).(D-volts)−B

In the equation above A and B are preselected constants. In the preferred embodiment A has a nominal value of 73.2 while B has a nominal value of 60.6.

Figure 2:
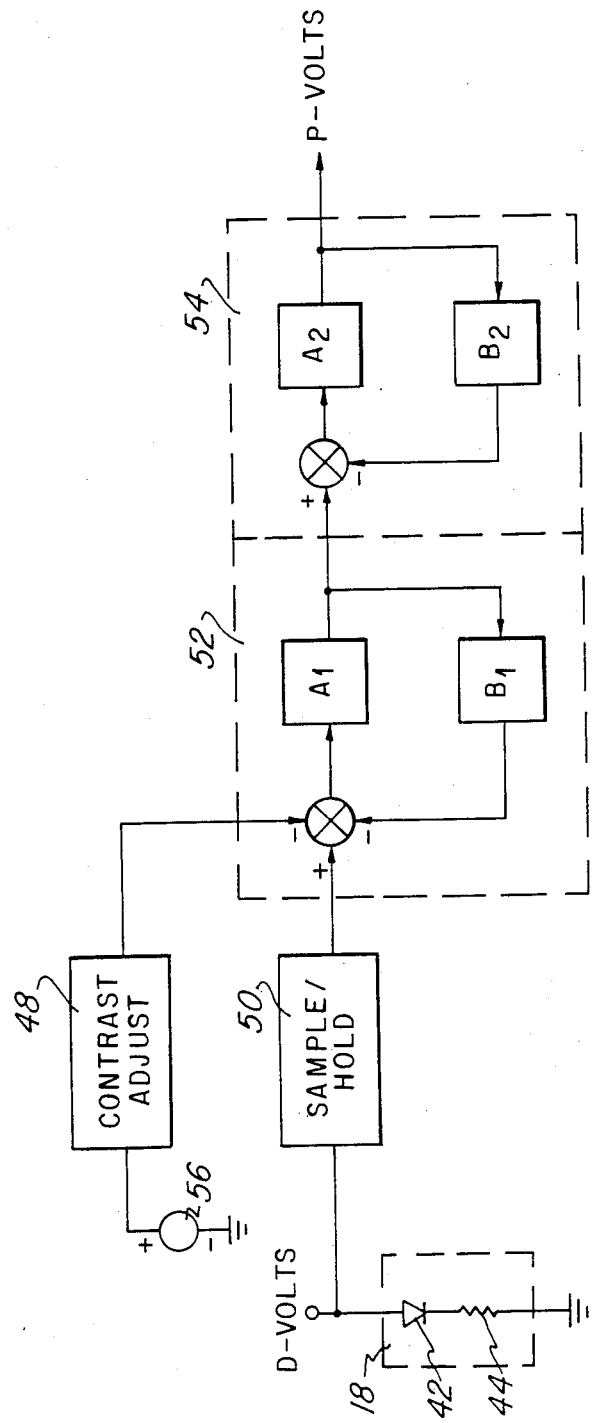
FIG. 2 is a block diagram of the switching regulator power supply of the preferred embodiment.

This relationship between D-volts and P-volts is implemented by the switching regulator and associated structure shown in block diagram form in FIG. 2. As mentioned previously D-volts is generated by the combination of diode 42 and resistor 44 which are located on printhead 18 itself. The D-volt reference is coupled through sample/hold circuit 50 to the non-inverting input of a difference amplifier 52. Difference amplifier 52 is comprised of a forward gain $A_1$ and a feedback ratio $B_1$. An offset voltage 56 is coupled through a contrast adjust circuit 48 to the inverting input of difference amplifier 52. The output of the difference amplifier 52 is coupled to the input of switching regulator 54 which has a large forward gain $A_2$ and a feedback ratio of $B_2$. The output of the switching regulator is the regulated P-volts.

In the structure of FIG. 2 the quantity D-volts is sampled by sample and hold circuit 50 only during those times when the printhead is not actually printing. While printing is taking place D-volts is decoupled from the difference amplifier and the most recent sample is used as the input to the difference amplifier. The reason for this is that large values of noise appear on D-volts when printing is actually taking place. Offset voltage 56 and contrast adjust 48 are selected to present an offset voltage of 0.83 volts to the inverting input of difference amplifier 52. The feedback ratios $B_1$ and $B_2$ have nominal value of 0.0314 and 0.435 respectively. It will be seen, therefore, that the structure implements the desired relationship between D-volts and P-volts with the nominal values of A and B given above.

Figure 3:
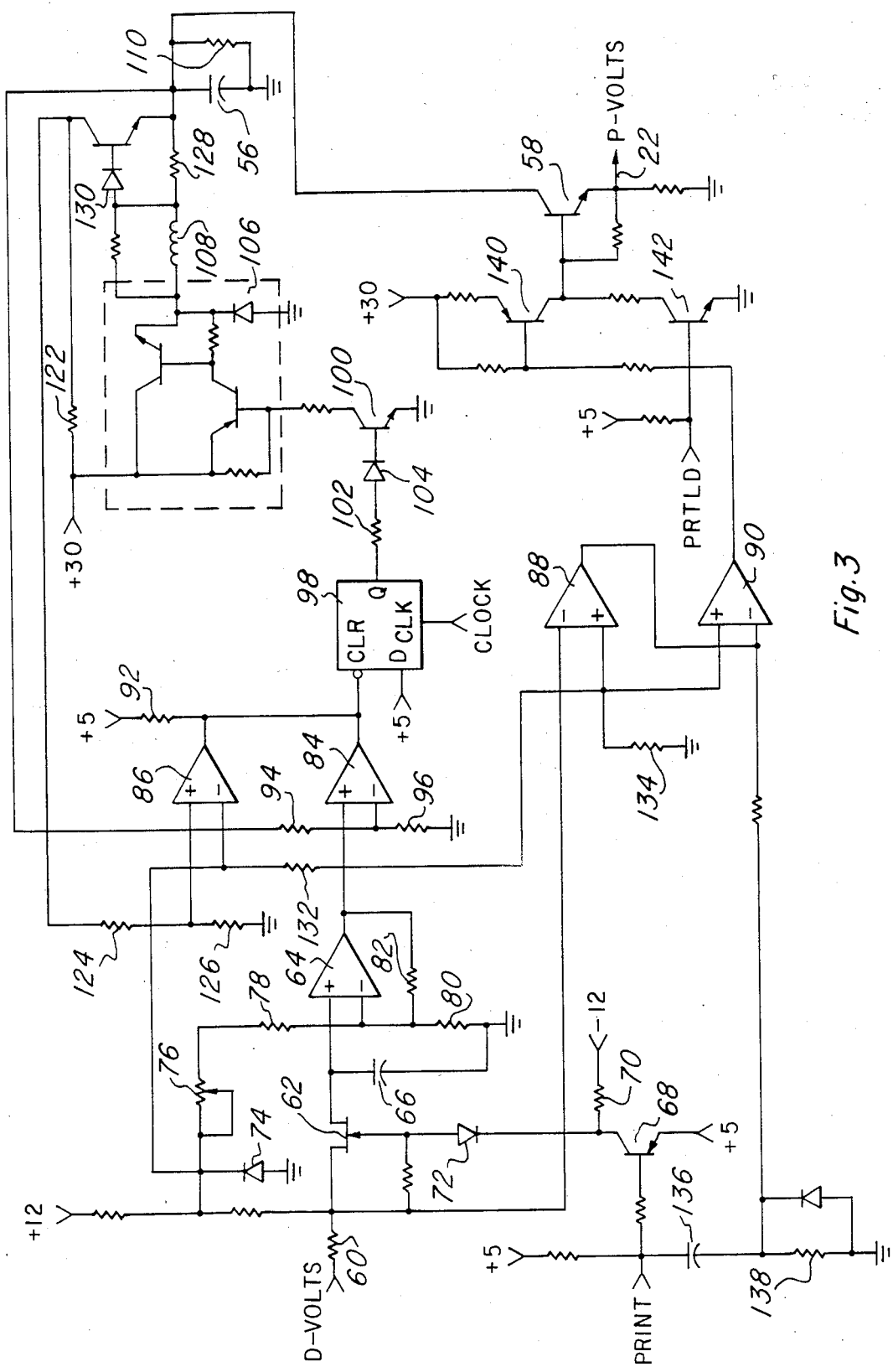
FIG. 3 is a schematic diagram giving circuit details of the regulator.

In the preferred embodiment the block diagram of FIG. 2 is implemented by the circuit shown schematically in FIG. 3. In FIG. 3 the PRINT signal is normally at ground potential but rises to 5.0 volts for a period of 4 milliseconds when printing is to be effected. The switching regulator output voltage is developed across capacitor 56. The effect of the PRINT pulse is to turn on transistor 58 thereby coupling the regulator output voltage to the thermal printhead via line 22. A related signal PRTLD is also normally at ground potential but rises to a level of 5.0 volts for period of 320 microseconds at the beginning of each PRINT pulse. The effect of this PRTLD pulse is to prevent transistor 58 from saturating during the early portion of the PRINT pulse. As a result the voltage supplied to printhead 18 during that time that PRTLD is high is less than the full voltage developed across capacitor 56. This early low voltage portion of each print cycle is used to strobe on the various mesas of the printhead in a column by column fashion as is described more fully in U.S. Pat. No. 4,172,990.

The CLOCK signal appearing in FIG. 3 is a squarewave signal having a frequency of 20 kilohertz.

Turning now to a detailed description of FIG. 3, the D-volts signal from the temperature sensing diode is coupled by resistor 60 and transistor 62 to the non-inverting input of operational amplifier 64. Transistor 62 is the sampling switch and stores the sampled D-volt signal on holding capacitor 66. During the print cycle the high level PRINT signal turns off transistor 68 thereby allowing the −12 volts supply to draw the gate of transistor 62 low through resistor 70 and diode 72. At these times the voltage to the non-inverting input of operational amplifier 64 is that held by capacitor 66. During non-printing times transistor 68 is turned on hard with the result that transistor 62 is also in the on state. An offset voltage is established by zener diode 74 which in the preferred embodiment has a nominal zener voltage of 5.6 volts. This offset voltage is coupled by potentiometer 76 and resistor 78 to the inverting input of operational amplifier 64. This inverting input is coupled to ground by resistor 80 and to the output of the operational amplifier by feedback resistor 82. Operational amplifier 64 and its associated gain establishing resistors comprise difference amplifier 52 of FIG. 2. Zener diode 74 is offset voltage 56 while potentiometer 76 and resistor 78 comprise contrast adjust circuit 48. The various resistances are selected as is well known in the art to result in the gain and offset values previously discussed.

The output of operational amplifier 64 is coupled to the positive input of comparator 84. Comparators 84, 86, 88 and 90 comprise a model LM339 quad comparator circuit. The LM339 has open collector outputs so that whenever the positive input to a comparator has a higher potential than the negative input, the comparator does not control the voltage at its output. Alternatively, when the negative input to the comparator is higher the comparator forces its output to be at ground potential. Thus in the case of comparators 84 and 86 which have a common output referenced through resistor 92 to a +5 volt supply, if the negative input of each comparator is lower than the associated positive input the outputs of the comparators will be at +5 volts. However, if either comparator has a dominant negative input the output of the comparators will be at ground potential.

The output voltage of the switching regulator, that is the voltage on capacitor 56, is coupled by the voltage divider comprising resistors 94 and 96 to the negative input of comparator 84. In the preferred embodiment resistor 94 has a value of 13K ohms and resistor 96 has a value of 10K ohms. This voltage divider establishes the gain through the switching regulator which gain is seen to have a value of 2.3.

The common output of comparators 84 and 86 provide the clear input of D-type flip flop 98. The D-input of the flip flop is referenced to a high logic level and the clock input receives the 20 kilohertz squarewave clock signal. The Q-output of flip flop 98 drives transistor 100 through resistor 102 and diode 104. Transistor 100 in turn controls a switching unit 106 which in the preferred embodiment comprises a model PIC645 unit. The PIC645 includes two transistors in a darlington like switching combination as well as the flyback diode. In operation switching unit 106 periodically connects the 30 volt supply to inductor 108. Current flowing in inductor 108 is used to periodically charge capacitor 56 and provide the current flow for resistor 110.

In operation filter capacitor 56 substantially reduces any ripple in the output voltage appearing across resistor 110 so that this output voltage when corrected for the feedback ratio of the regulator has a nominal value very near that of the reference voltage appearing at the positive input of comparator 84. Under normal circumstances when the clock waveform providing the clock input to flip flop 98 has a positive going transition, the reference voltage at the positive input of comparator 84 will be slightly greater than that appearing at the negative input of the comparator. As a consequence the output of comparator 84 will be at a high logic level. Under these conditions the positive going transition of the clock waveform couples the high logic level at the D-input to the Q-output of the flip flop with the result that switching unit 106 is turned on thereby coupling the 30 volt supply to inductor 108. The current flowing in inductor 108 charges capacitor 56 causing a relatively linear increase in the output voltage appearing across that capacitor. The charging current continues until the point in time when the voltage on capacitor 56 increases sufficiently so that the negative input of comparator 84 becomes more positive than the positive input. At this point in time the comparator output switches low thereby clearing flip flop 98 causing its Q output to go low and the switch is opened. With switching unit 106 open the current in inductor 108 and the voltage across capacitor 56 begin to decrease and the output of comparator 84 again goes high prior to the next positive going transition of the clock waveform. It will be seen, therefore, that the regulator functions to cause the turn on period of switching unit 106 to be just long enough to maintain the peak values of the output voltage at the level dictated by the value of the reference voltage at the positive input of comparator 84. This is true despite varations in the amount of power demanded by the printhead load and variations in the reference voltage stemming from D-volts variations. Thus there is provided a pulse duration modulated switching regulator power supply for the thermal printhead. The switching action is synchronized to the clock which is selected to operate at a frequency above the audible range.

While the basic operation of the circuit has been described, other peripheral features of the invention will next be discussed.

Over current protection is provided by the combined action of transistor 120 and comparator 86. Transistor 120 is normally in the off state and the 30 volt supply operating through resistors 122, 124 and 126 establishes a potential of about 6.35 volts at the noninverting input of comparator 86. This is contrasted with the 5.6 volt potential at the inverting input of comparator 86 established by zener diode 74. Thus under normal circumstances comparator 86 does not control the potential at its output. Under these circumstances the switching regulator operates in its normal mode.

The current flowing in inductor 108 also flows through resistor 128 to capacitor 56 and resistor 110. The voltage developed across resistor 128 in response to this current flow appears across the series combination of diode 130 and the base emitter junction of transistor 120. When the current flowing in inductor 108 exceeds a preselected bound the resultant voltage appearing across resistor 128 is of sufficient magnitude to overcome the forward voltage drop of diode 130 and turn on transistor 120. With transistor 120 driven into saturation the voltage appearing at the collector of transistor 120 is approximately that appearing across capacitor 56. This voltage is sufficiently below that of the +30 volt supply that the resultant voltage appearing at the noninverting input of comparator 86 drops below the voltage appearing at the inverting input. Under these circumstances comparator 86 pulls its output to ground potential thereby clearing flip flop 98. As long as the output of comparator 86 is held low the Q output of flip flop 98 can not go high and switching unit 106 is unable to turn on. Ultimately the current flowing in inductor 108 falls below the critical level, and transistor 120 turns off. Comparator 86 then releases its output and the switching regulator loop is again able to operate in the normal mode. Resistor 128 is chosen to insure that transistor 120 is driven into saturation upon the occurence of a preselected limiting current in inductor 108. Thus there is provided a very simple and effective over current limiting mechanism.

The circuit of FIG. 3 also operates to prevent coupling the regulator output voltage to the printhead in the event of failure of the D-volts signal. This prevents printhead destruction that might result from an excessively high P-volt signal.

The voltage on zener diode 74 is divided by resistors 132 and 134 to a 2.25 volt level at the noninverting inputs of comparators 88 and 90. The positive going PRINT pulse, which as previously noted has a duration of four milliseconds, is AC coupled by capacitor 136 and resistor 138 to the inverting input of comparator 90. The RC time constant is selected so that under normal circumstances, upon the occurence of a PRINT pulse, the inverting input of comparator 90 will be at a higher potential than the noninverting input for a period of time slightly exceeding four milliseconds. As a result the output of comparator 90 is normally pulled low for the full four millisecond duration of each PRINT pulse. This turns on transistor 140, and if transistor 142 is held off, transistor 58 will be driven into saturation thereby coupling the voltage across capacitor 56 to the P-volt output. However, as previously noted for a short time at the beginning of each print pulse the PRTLD signal also goes high. As a result, for the duration of the PRTLD pulse transistor 142 is also turned on to prevent transistor 58 from saturating. A portion of the voltage in capacitor 56 is dropped across transistor 58 so that the full potential does not appear at the P-volt output. When the PRTLD pulse terminates transistor 142 is again turned off, and with transistor 140 turned on transistor 58 saturates thereby coupling the capacitor 56 voltage to the P-volt output.

Under normal circumstances the D-volt signal which effectively appears at the inverting input of comparator 88 is of lower potential than the 2.25 volts appearing at the noninverting input of that comparator. As a result the output of comparator 88 under these circumstances has no effect on the operation of the circuit. In the event that the D-volt signal should fail in an open circuit mode, the reference voltage appearing at the output of operational amplifier 64 would rise to an abnormally high level thereby resulting in the generation of an excessively high P-volt signal. Comparator 88 guards against this eventuality. If D-volts goes open then the zener diode 74 voltage is effectively coupled to the inverting input of comparator 88 and the output of the comparator is held at ground potential. This blocks the AC coupling of any subsequent PRINT pulse to the inverting input of comparator 90 so that transistor 58 cannot be turned on. Thus even though an excessive potential may be generated at capacitor 56, this voltage is never switched to the printhead. The illustrated circuit prevents destruction of the thermal printhead in the event of failure of the D-volt signal.

Whereas there has been disclosed the preferred embodiment of the invention, there may be suggested to those skilled in the art certain minor modifications which do not depart from the spirit and scope of the invention as set forth in the appended claims.

What is claimed is:

1. A printing terminal having means for providing a hard copy display, comprising:
   (a) thermal printing means;
   (b) temperature indicating means located to indicate the temperature of the thermal printing means; and
   (c) switching regulator power supply means for providing a controlled voltage to the thermal printing means, comprising:
   (i) switching means for operatively connecting a voltage source in circuit with the thermal printing means;
   (ii) means for establishing a preselected reference level in response to a signal from the temperature indicating means representative of the temperature of the thermal printing means,
   (iii) bi-stable means, coupled to the switching means having a first output state to close the switching means and a second output state to open the switching means; and
   (iv) control means connected to turn the bi-stable means on when the controlled voltage is less than the preselected reference level and to turn the bi-stable means off when the controlled voltage exceeds the preselected reference level, causing the first and second output states, respectively, to occur.

2. The terminal of claim 1 wherein the bi-stable means comprises a flip-flop, and further comprises a clock signal for clocking the control means output into the flip flop.

3. The terminal of claim 1 further comprising an inductor for filtering the controlled voltage and means for causing the output of the flip flop to change to the second state when the current flowing in the inductor exceeds a preselected limit.

* * * * *